(12) United States Patent
Ling et al.

(10) Patent No.: US 10,560,251 B2
(45) Date of Patent: Feb. 11, 2020

(54) METHOD AND SYSTEM FOR POWER MANAGEMENT IN A NETWORK DEVICE BASED ON MULTI-PROTOCOL DETECTION

(71) Applicant: MaxLinear, Inc., Carlsbad, CA (US)

(72) Inventors: Curtis Ling, Carlsbad, CA (US); Timothy Gallagher, Encinitas, CA (US); Sridhar Ramesh, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 59 days.

(21) Appl. No.: 14/012,772

(22) Filed: Aug. 28, 2013

(65) Prior Publication Data

US 2014/0064420 A1 Mar. 6, 2014

Related U.S. Application Data

(60) Provisional application No. 61/694,008, filed on Aug. 28, 2012.

(51) Int. Cl.
*H04L 7/00* (2006.01)

(52) U.S. Cl.
CPC .................... *H04L 7/00* (2013.01)

(58) Field of Classification Search
CPC ........... H03D 7/18; H04L 27/22; H04L 27/38; H04L 7/00
See application file for complete search history.

(56) References Cited

U.S. PATENT DOCUMENTS

| 3,862,373 | A | * | 1/1975 | Cohen et al. | 370/299 |
| 4,958,156 | A | | 9/1990 | Ando et al. | |
| 5,302,950 | A | | 4/1994 | Johnson et al. | |
| 5,815,101 | A | * | 9/1998 | Fonte | 341/123 |
| 6,035,000 | A | | 3/2000 | Bingham | |
| 7,162,732 | B2 | | 1/2007 | Ovadia | |
| 7,605,757 | B1 | * | 10/2009 | Gribble | G01S 1/045 342/195 |

(Continued)

OTHER PUBLICATIONS

Olshausen A. B; "Aliasing" PSC 129—Sensory Processes, Oct. 10, 2000.*

(Continued)

*Primary Examiner* — Sam K Ahn
*Assistant Examiner* — Amneet Singh
(74) *Attorney, Agent, or Firm* — McAndrews, Held & Malloy, Ltd.

(57) ABSTRACT

A network device may comprise one or more circuits including a clock signal generator, an ADC, and a processor. The ADC may digitize a received signal across a range of frequencies that encompasses a first band of frequencies used for a first network and a second band of frequencies used for a second network. A sampling frequency of the ADC may be determined by a frequency of a clock signal output by the clock signal generator. The processor may determine whether the first network is active and whether the second network is active. The processor may configure the clock generator such that, when both of the first network and the second network are active, the clock signal is set to a first frequency, and when the first network is active and the second network is inactive, the clock signal is set to a second frequency.

20 Claims, 6 Drawing Sheets

(56) References Cited

U.S. PATENT DOCUMENTS

| | | | | |
|---|---|---|---|---|
| 8,301,176 | B1* | 10/2012 | Yellin | H04W 52/0229 |
| | | | | 455/458 |
| 8,310,601 | B2* | 11/2012 | Ahluwalia et al. | 348/731 |
| 8,953,715 | B1* | 2/2015 | Haddadin et al. | 375/316 |
| 2002/0177446 | A1* | 11/2002 | Bugeja et al. | 455/450 |
| 2002/0193090 | A1* | 12/2002 | Sugar et al. | 455/343 |
| 2004/0161062 | A1* | 8/2004 | Richey et al. | 375/344 |
| 2005/0069046 | A1* | 3/2005 | Tsui et al. | 375/260 |
| 2005/0157818 | A1* | 7/2005 | Dauphinee | 375/316 |
| 2006/0087961 | A1* | 4/2006 | Chang | H04L 27/2607 |
| | | | | 370/203 |
| 2006/0171445 | A1* | 8/2006 | Batra | H04B 1/719 |
| | | | | 375/130 |
| 2006/0215590 | A1* | 9/2006 | Sharma et al. | 370/311 |
| 2007/0064839 | A1* | 3/2007 | Luu | 375/340 |
| 2008/0026717 | A1* | 1/2008 | Huynh | 455/266 |
| 2008/0084941 | A1* | 4/2008 | Mohanty | H04W 52/0225 |
| | | | | 375/260 |
| 2008/0154804 | A1* | 6/2008 | Dawson | G06F 11/3409 |
| | | | | 706/8 |
| 2009/0224974 | A1* | 9/2009 | Lorenz | G01S 19/34 |
| | | | | 342/357.63 |
| 2011/0026567 | A1* | 2/2011 | Sampath | H04B 1/0032 |
| | | | | 375/219 |
| 2011/0258678 | A1* | 10/2011 | Cowling et al. | 725/125 |
| 2011/0294453 | A1* | 12/2011 | Mishali et al. | 455/293 |
| 2012/0076249 | A1* | 3/2012 | Seo | H04B 1/0007 |
| | | | | 375/349 |
| 2013/0135983 | A1 | 5/2013 | Gallagher et al. | |

OTHER PUBLICATIONS

Alippi, C.; Anastasi, G.; Di Francesco, M.; Roveri, M., "An Adaptive Sampling Algorithm for Effective Energy Management in Wireless Sensor Networks With Energy-Hungry Sensors," Instrumentation and Measurement, IEEE Transactions on , vol. 59, No. 2, pp. 335,344, Feb. 2010.*

United States Frequency Allocation, "The Radio Spectrum," U.S Department of Commerce, National Telecommunications and Information Administration, Office of Spectrum Management, Oct. 2003.*

* cited by examiner

METHOD AND SYSTEM FOR POWER MANAGEMENT IN A NETWORK DEVICE BASED ON MULTI-PROTOCOL DETECTION

PRIORITY CLAIM

This patent application makes reference to, claims priority to and claims benefit from U.S. Provisional Patent Application Ser. No. 61/694,008 entitled "Method and System for Interference Avoidance in a Multiprotocol Communication System" and filed on Aug. 28, 2012.

The above-identified application is hereby incorporated herein by reference in its entirety.

FIELD OF THE INVENTION

Certain embodiments of the invention relate to multimedia communication. More specifically, certain embodiments of the invention relate to a method and system for Power Management in a Network Device Based on Multi-Protocol Detection.

BACKGROUND OF THE INVENTION

In digital sampling, the Nyquist frequency is one half the sampling frequency, and is also called the folding frequency. As a result of sampling, a signal that is higher in frequency than the Nyquist frequency will "fold" to a frequency below the Nyquist frequency by the same amount that the signal is above the Nyquist frequency. Although this folding frequency signal may be mitigated with filters before the sampler, such filters adversely affect the system cost and power consumption.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for power management in a network device based on multi-standard detection, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1A:
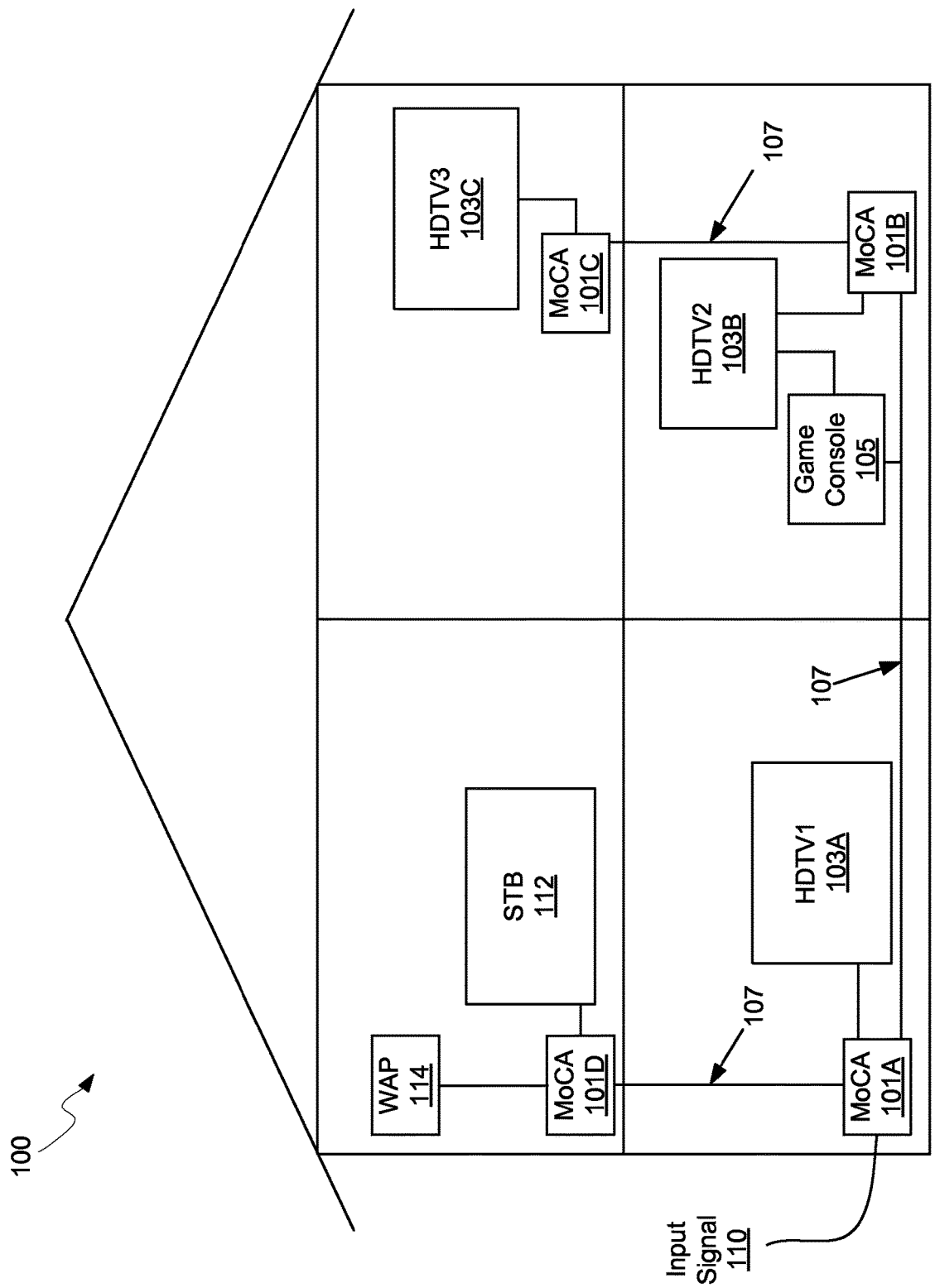
FIG. 1A is a diagram illustrating an exemplary wired network in a customer premises, in accordance with an embodiment of the invention.

FIG. 1A is a diagram illustrating an exemplary wired network in a customer premises, in accordance with an embodiment of the invention. Referring to FIG. 1A, there is shown a customer premises (e.g., home or office) 100 comprising a plurality of rooms, each which may have one or more networked devices, such as Multimedia over Cable Alliance (MoCA) bridges 101A-101C, high-definition televisions (HDTVs) 103A-103C, set-top-boxes 112 (e.g., cable TV receiver, satellite TV receiver, DOCSIS modem, etc.), wireless access point (114), and a game console 105. There is also shown coaxial cables 107, and an input signal 110, which may be provided by a cable head-end or a satellite signal source, for example.

The MoCA bridges 101A-101C (or general MoCA devices) may comprise network bridges that enable a secure wired network utilizing the coaxial cables 107 in the customer premises 100. The MoCA bridges 101A-101C may operate under the MoCA 1.x or 2.x specification, for example, and may communicate signals between bridges in a 1-2 GHz frequency range. Other communication protocols may be utilized on the same coaxial cables 107 leading to possible interference. For example, data over cable service interface standard (DOCSIS) signals may be communicated over the coaxial lines 107 for providing general data communication over the television cable infrastructure. As another example, wireless signals transmitted by the WAP 114 may couple onto the coaxial cables 107.

One or more of the MoCA bridges 101A-101C may comprise a network controller in the wired network, coordinating the wired network communications as per the MoCA standard. For example, a first of the MoCA bridges 101A-101C may operate as the MoCA network controller (NC), while a second operates as a back-up NC.

Cable television signals, including DOCSIS signals, may be communicated in, for example, the 50 MHz to 1 GHz range. Traditional receivers typically used a heterodyne architecture to select one or a few channels out of the entire cable spectrum (each channel being 6 or 8 MHz). However, it may be advantageous to utilize an architecture that digitizes the entire cable spectrum rather than a few channels. This allows any combination of channels to be processed digitally. Thus, MoCA signals in the 2 GHz range may (depending on the sampling rate) fold down to (or alias into) the 700 MHz range, possibly interfering with the cable signals. The cable range generally has about 150 6-MHz TV channels, some of which are allocated to DOCSIS, some to digital television, and some to analog television. DOCSIS may, for example, be used to provide Internet access to the cable subscriber.

When the signal on the coaxial cables is sampled at a sampling frequency that is not sufficiently high, MoCA signals may fold down into the cable/DOCSIS frequency spectrum resulting in interference between the two protocols and/or making it more difficult/expensive to recover received the cable signal. An example is depicted in FIGS. 2A and 2B.

Figure 1B:
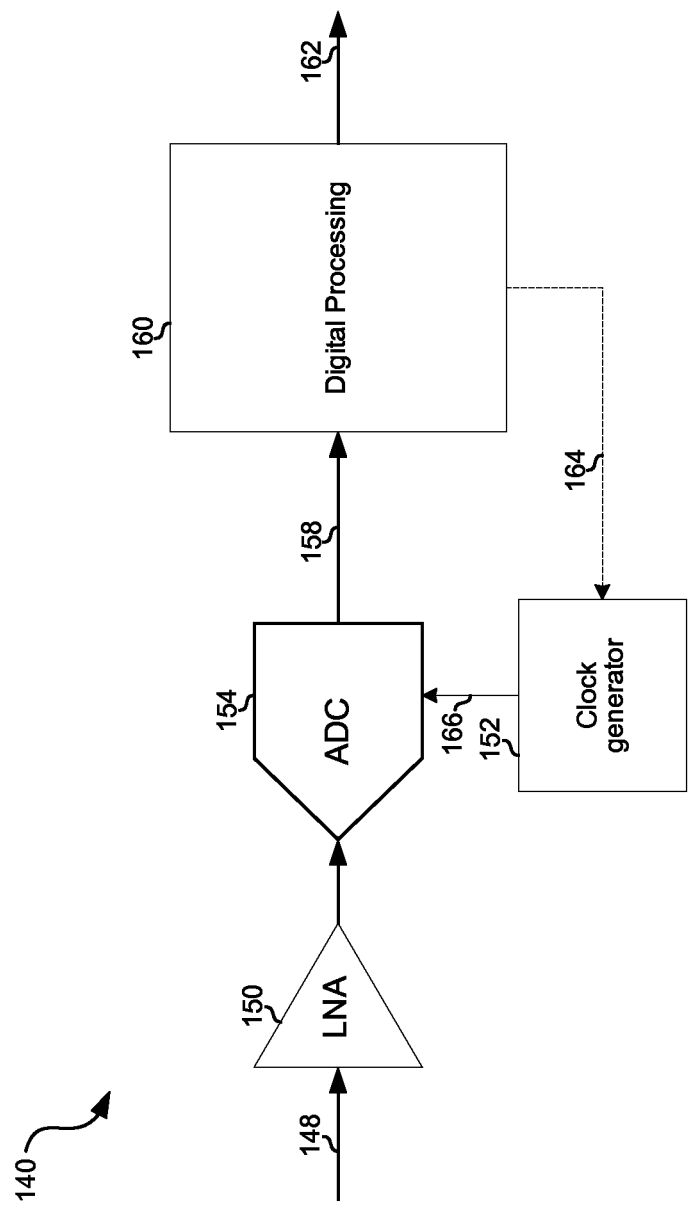
FIG. 1B is a diagram illustrating exemplary circuitry of a device which communicates via a medium shared by multiple networks/protocols.

FIG. 1B is a diagram illustrating exemplary circuitry of a device which communicates via a medium shared by multiple networks/protocols. Shown is a device 140 which may correspond to, for example, the MoCA device 101A, STB 112, WAP 114, any combination thereof, or any network device coupled to a communication medium shared by multiple networks. The device 140 comprises a low noise amplifier (LNA) 150, an analog-to-digital converter 154, a clock generator 152, and a digital processor 160.

The LNA 150 may be operable to amplify signal 148 received via a shared communication medium (e.g., coaxial cable 107). The LNA 150 may be operable to amplify the signal 148 over a range of frequencies that encompasses frequency bands used by multiple networks/protocols, such as, for example, the range of frequencies ~50 MHz to ~1550 MHz shown in FIGS. 2A and 2B.

Figure 2A:
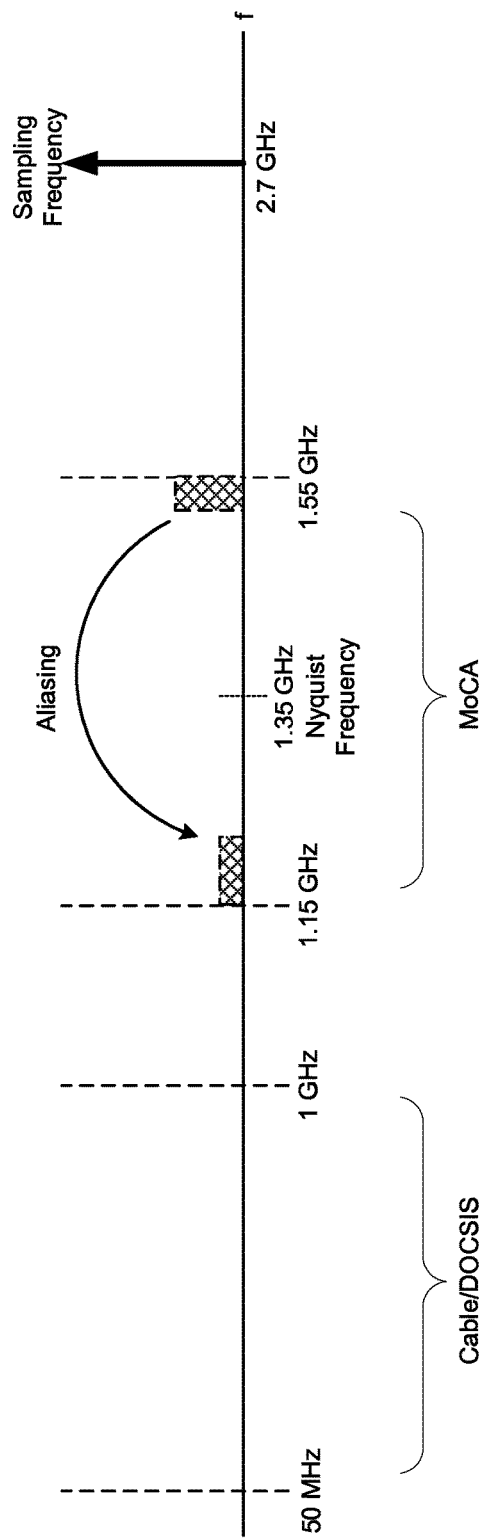
FIGS. 2A and 2B illustrate effects of different sampling frequencies for sampling signals on a medium which carries signals of multiple-networks which adhere to multiple standards/protocols.
Figure 2B:
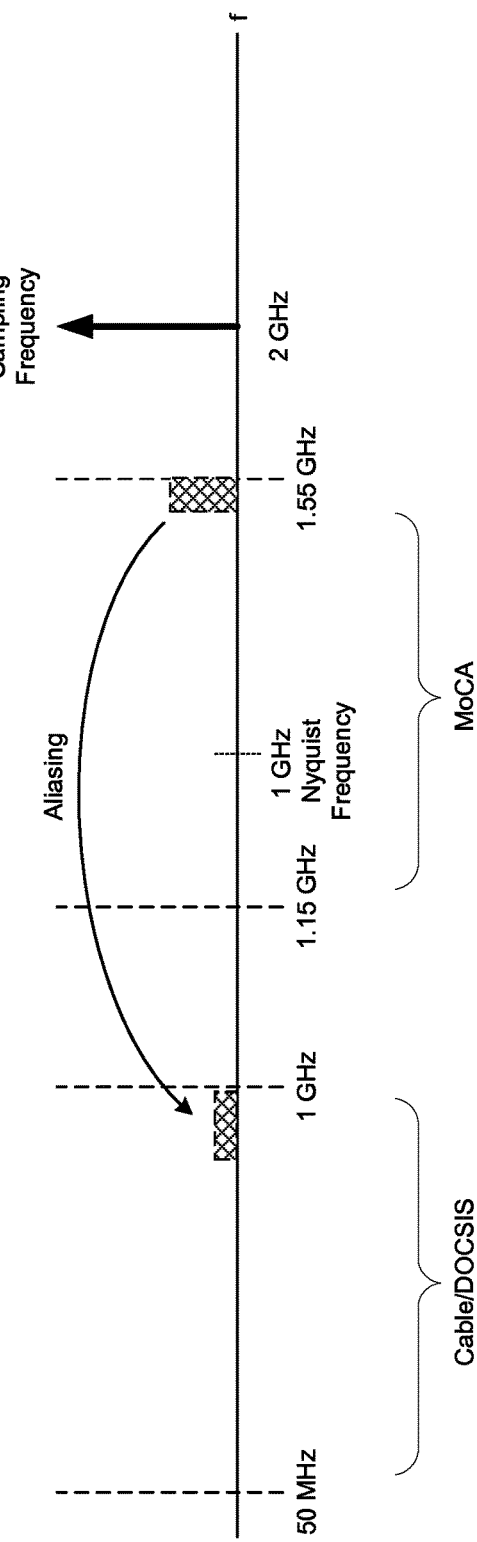

The analog-to-digital converter 154, may be operable to concurrently digitize signals over a range of frequencies that encompasses frequency bands used by multiple networks/protocols, such as the range of frequencies ~50 MHz to ~1550 MHz shown in FIGS. 2A and 2B.

The clock generator 152 may be operable to generate a clock signal 166 that oscillates at a frequency controlled by the digital processor 160 via control signal 164. The clock signal 166 may be, for example, a sinusoid or a square wave.

The digital processor 160 may be operable to process (e.g., filter, demodulate, decode, etc.) the digitized signal 158 output by the ADC 154. The processor 160 may process the signal 158 to detect whether one or more networks are active on the shared communication medium via which the signal 148 is received. In an example implementation, the processor 160 may perform a spectral analysis (e.g., using FFT) of the frequency bands used by the various networks and determine whether or not the network(s) are active based on the signal strength in the frequency bands. For example, where signal strength in the MoCA frequency band is below a threshold for a determined period of time, the processor may determine that the MoCA network is inactive. In an example implementation, the processor 160 may perform packet inspection on the various networks to determine whether each of the networks is active. For example, where expected network packets (e.g., MAP, UCD, and/or the like) are not received for a determined amount of time, a network may be determined to be inactive. In an example implementation, the processor may operate as a source and/or sink of network management messages specifically intended to indicate activity or inactivity of networks that use the shared medium.

The processor 160 may also process portions of the signal 158 corresponding to active networks to recover data transmitted on the active network(s) and output the data as signal 162.

In FIGS. 2A and 2B, there is shown a communication system used for a cable/DOCSIS network and a MoCA network. When the cable DOCSIS network is active, the cable/DOCSIS network uses a band that spans from 50 MHz to 1 GHz. Generally speaking, whether a network/protocol is determined to be active may depend on the type of network/protocol and the specific circumstances of the environment in which the network/protocol is operating. The definition of what is an "active" network may be determined on a protocol-by-protocol basis (e.g., criteria used to determine whether a MoCA network is active may be different than criteria used to determine whether a cable/DOCSIS network is active). The definition of what is an "active" network may be determined on a location-by-location basis (e.g., criteria used to determine whether one or more networks in a first home or office are active may be different than criteria used to determine whether one or more networks in a second home or office active). When the MoCA network is active, the MoCA network uses a band that spans from 1.15 to 1.55 GHz. During some time intervals, the MoCA network may be inactive because, for example, the MoCA devices support a low-power mode in which they are inactive during periods of time and/or because a network administrator has disabled the network.

In FIGS. 2A and 2B, both the cable DOCSIS and MoCA network are active. Accordingly, when the sampling frequency is not sufficiently high, as in FIG. 2B, the MoCA signals fold down into the cable/DOCSIS band thus causing interference between the two networks. In FIG. 2A, on the other hand, where the sampling frequency is sufficiently high, signals in the MoCA band fold down into the MoCA band, and not into the cable/DOCSIS band.

Accordingly, in accordance with aspects of the invention, the sampling frequency shown in FIG. 2B may be selected when the MoCA network/protocol is not in use and the sampling frequency shown in FIG. 2A may be selected when the MoCA network/protocol is in use. Reducing the sampling frequency may significantly reduce power consumption in devices attempting to receive cable/DOCSIS signals (e.g., devices 112, 114, and 103A-103C of FIG. 1).

To mitigate the interference between communications protocols, such as between MoCA and DOCSIS, various aspects of the present invention may comprise utilizing knowledge of the frequency utilization in the MoCA and DOCSIS spectra to minimize MoCA/DOCSIS interference (e.g., by adjusting MoCA frequency utilization to reduce alias effects in the DOCSIS frequency space).

Note that the identification of channels in use by the communications protocols, and the adaptive utilization of communication channels to mitigate interference, may be a dynamic process. For example, as different communication networks/protocols (e.g., cable/DOCSIS and MoCA) toggle between active and inactive states, and/or as different channels/bands of active communication networks/protocols toggle between used and unused states, one or more sampling frequencies may be adjusted. The adjustment may, for example, be performed periodically (e.g., by scheduled periodic test) or may be event-driven (e.g., upon detection of a change in spectral content on the coaxial cabling 107, upon detection of a user command that will result in a change in network/protocol utilization, etc.). Similarly, the monitoring for such events (e.g., activating and deactivating of a network/protocol) may be performed periodically and/or may be performed on an event-driven basis (e.g., upon power up, upon reset, and/or in response to a management message instructing such monitoring).

Figure 3A:
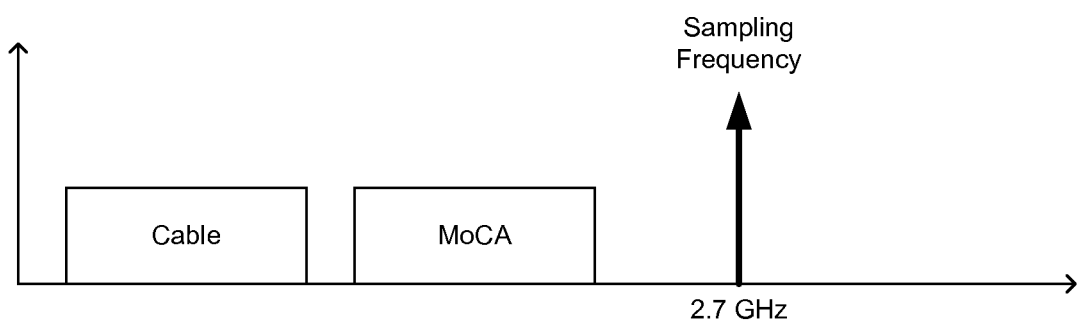
FIGS. 3A and 3B illustrate controlling a sampling frequency for sampling a cable/DOCSIS signal based on whether a MoCA network is active.
Figure 3B:
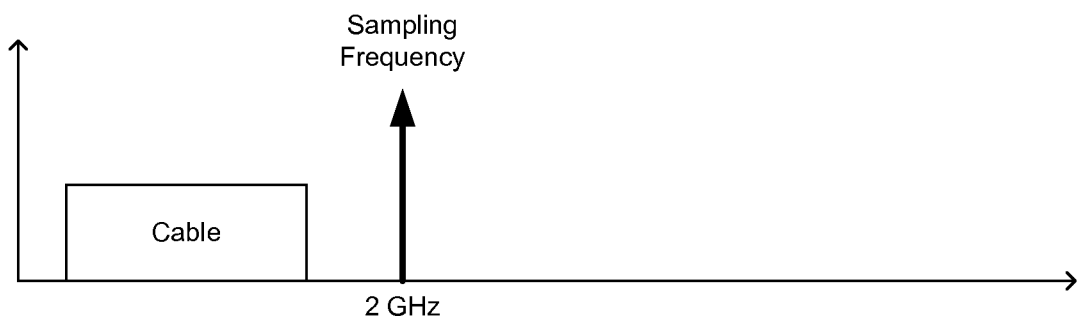

FIGS. 3A and 3B illustrate controlling a sampling frequency for sampling a cable/DOCSIS signal based on whether a MoCA network is active. In FIG. 3A, the MoCA network/protocol is active and a higher sampling frequency is correspondingly selected (2.7 GHz is shown for illustration, but is not intended to be limiting). In FIG. 3B, the MoCA network is inactive and a lower sampling frequency is correspondingly selected (2 GHz is shown for illustration, but is not intended to be limiting). Considerable energy may be saved when using the lower sampling frequency of FIG. 3B as compared to using the sampling frequency of FIG. 3A.

Whether the MoCA network is active may be determined by, for example, receiving and processing the entire band encompassing the cable/DOCSIS band and the MoCA band. Additionally or alternatively, whether the MoCA network is active may be determined based on communication of network management messages. For example, a MoCA network controller may send a control message upon being activated and may send a control message just prior to becoming inactive.

While FIGS. 2A-3B show MoCA and cable/DOCSIS communications networks/protocols, detection of protocols/ frequency bands in use and corresponding adjustment of sampling frequency may be applicable to any networks/ protocols which may coexist in a communication system. That is, a sampling frequency used for sampling signals of a first network/protocol may be controlled based on whether a second network/protocol is active. As an example of networks/protocols other than MoCA and cable/DOCSIS, FIGS. 4A and 4B illustrate an example embodiment applied to coexisting satellite television and Wi-Fi networks.

Figure 4A:
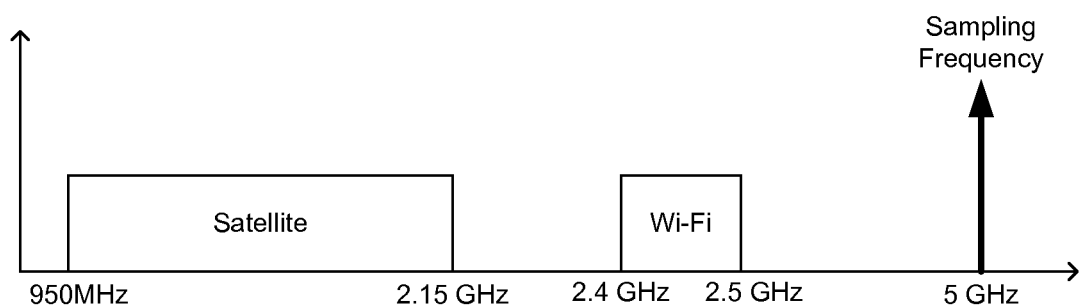
FIGS. 4A and 4B illustrate controlling a sample frequency for sampling a satellite signal based on whether a Wi-Fi network is active.
Figure 4B:
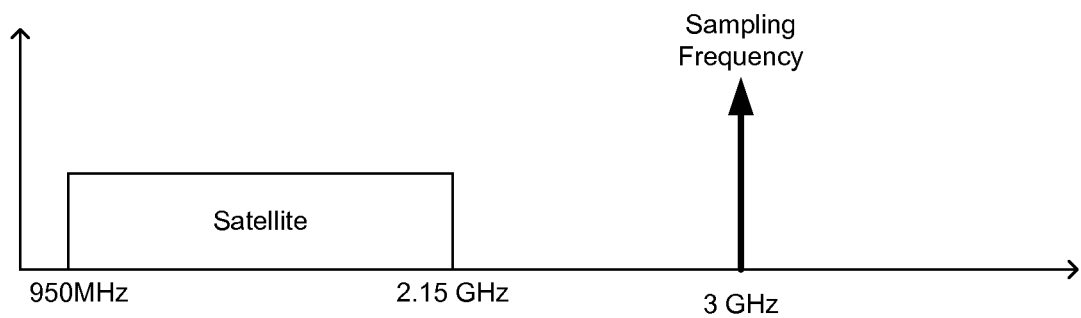

FIGS. 4A and 4B illustrate controlling a sample frequency for sampling a satellite signal based on whether a Wi-Fi network is active. FIGS. 4A and 4B illustrate controlling a sampling frequency for sampling a satellite (e.g., direct broadcast satellite (DBS)) television signal based on whether a Wi-Fi network is active. In FIG. 4B, the Wi-Fi network/protocol is active and coupling into the communication medium (e.g., cabling 107) that is carrying the satellite television signal. Accordingly, a higher sampling frequency is selected (5 GHz is shown for illustration, but is not intended to be limiting) to prevent the Wi-Fi signal coupled onto the communication medium from aliasing down into the satellite television band. In FIG. 4B, the Wi-Fi network is inactive. Accordingly, a lower sampling frequency is selected (3 GHz is shown for illustration, but is not intended to be limiting). Considerable energy may be saved when using the lower sampling frequency of FIG. 4B as compared to using the sampling frequency of FIG. 4B.

Whether the Wi-Fi network is active may be determined by, for example, receiving and processing the entire band encompassing the satellite television band and the Wi-Fi band. For example, the entire band from 950 MHz to 2.5 GHz may be concurrently digitized via ADC 154 (FIG. 1B) and a fast Fourier transform (FFT) may be performed on the digitized band (e.g., in digital processing circuitry 160) to determine signal strength across the digitized band. Additionally or alternatively, whether the Wi-Fi network is active may be determined based on communication of network management messages. For example, the WAP 114 controller may send a control message onto the cabling 107 upon being activated and may send a control message onto the cabling 107 just prior to becoming inactive.

Figure 5:
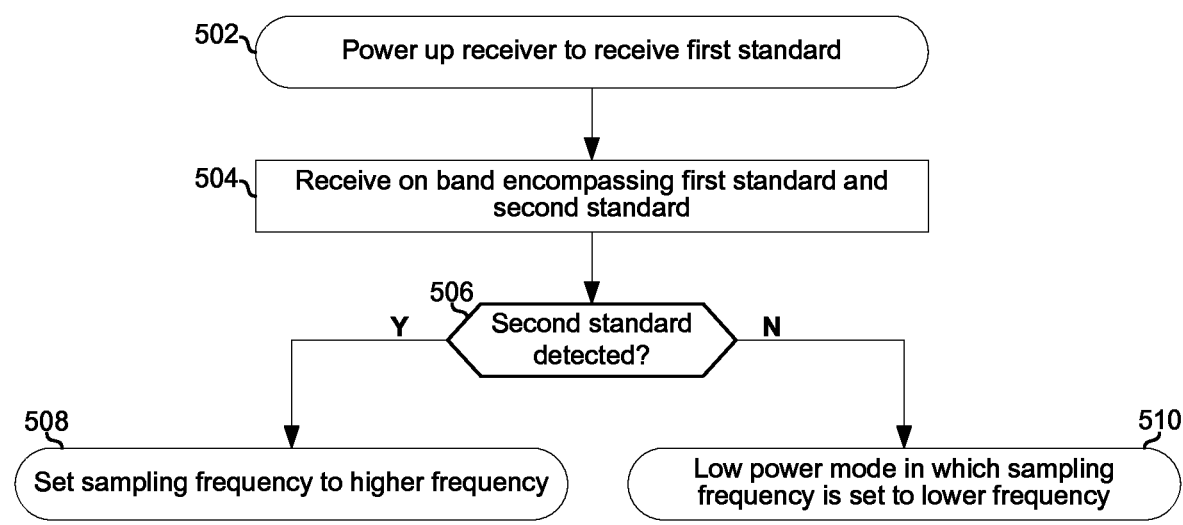
FIG. 5 is a flow chart illustrating example steps for controlling sampling frequency in a multi-protocol environment.

FIG. 5 is a flow chart illustrating example steps for controlling sampling frequency in a multi-protocol environment. In step 502, a device which receives signals of a first protocol is powered up. In step 504, the device receives a frequency band encompassing the first, desired network/ protocol, and a second, potentially-interfering protocol/net- work. For example, a cable/DOCSIS device may receive over the band from 50 MHz to 1.55 GHz to detect whether a cable/DOCSIS network is active and whether a MoCA network is active. In step 506, the device determines whether the second protocol/network is active. If so, then in step 508, a higher sampling frequency is used for sampling signals of the first network/protocol. If not, then in step 510 a lower sampling frequency is used for sampling signals of the first network/protocol.

In an example embodiment, a device may dynamically adjust a sampling frequency based on which networks/ protocols are active when in a power-saving mode, but may use a fixed sampling frequency, regardless of the networks/ protocols that are active, when not in a power-saving mode.

In accordance with an example implementation of this disclosure, a network device (e.g., wireless access point 114, MoCA device 101A, and/or STB 112) may comprise one or more circuits including a clock signal generator (e.g., 152), an analog-to-digital converter (ADC) (e.g., 154), and a processor (e.g., 160). The ADC may be operable to digitize a received signal (e.g., 148) across a range of frequencies that encompasses a first band of frequencies used for a first network (e.g., 50 to 1000 MHz used for a cable/DOCSIS network) and a second band of frequencies used for a second network (e.g., 1150 to 1550 MHz used for a MoCA network). A sampling frequency of the ADC may be determined by a frequency of clock signal output by the clock signal generator (e.g., 166 output by generator 152). The processor may be operable to determine whether the first network is active and whether the second network is active. The processor may be operable to configure the clock generator such that, when both of the first network and the second network are active, the clock signal is set to a first frequency, and when the first network is active and the second network is inactive, the clock signal is set to a second frequency. In this example implementation, when the clock signal is set to the first frequency, a difference between half the first frequency and a highest frequency of the second band is less than a difference between half the first frequency and a highest frequency of the first band. In this example implementation, when the clock signal is set to the second frequency, a difference between half the second frequency and a highest frequency of the second band is more than a difference between half the second frequency and a highest frequency of the first band. In this example implementation, the first band may be at a lower frequency than the second band, the first frequency may be higher than a highest frequency of the second band, and the second frequency may be lower than the highest frequency of the second band. The processor may be operable to detect activity of the first network and the second network based on a spectral analysis of the received signal, and/or based on control messages communicated on the first network and/or control messages communicated on the second network.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for Power Management in a Network Device Based on Multi-protocol Detection.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
one or more circuits comprising a clock signal generator, an analog-to-digital converter (ADC), and a processor, wherein:
said ADC is configured to digitize a received signal across a range of frequencies, said received signal encompassing one or both of a first band of frequencies used for a first network and a second band of frequencies used for a second network, wherein said first network and said second network adaptively utilize a communication channel to dynamically mitigate interference from an aliased signal, and wherein the first band of frequencies used for said first network and said second band of frequencies used for said second network are concurrently digitized;
a sampling frequency of said ADC is determined by a frequency of a clock signal output by said clock signal generator; and
if said system is not in a power-saving mode, then said processor is configured to set said clock signal to a fixed sampling frequency, else said processor is configured to set said clock signal to one of a first frequency and a second frequency, wherein:
said processor is configured to determine network activity on a location-by-location basis;
criteria used in a first location to determine network activity are different than criteria used in a second location to determine network activity;
said first frequency and said second frequency are each less than twice a highest frequency of said second band of frequencies;
said second band of frequencies alias into said first band of frequencies when said clock signal is set to said second frequency;
when both of said first network and said second network are active, said clock signal is set to said first frequency; and
when said first network is active and said second network is inactive, said clock signal is set to said second frequency.

2. The system of claim 1, wherein:
when said clock signal is set to said first frequency, half of said first frequency subtracted from a highest frequency of said second band is less than half of said first frequency minus a highest frequency of said first band; and when said clock signal is set to said second frequency, half of said second frequency subtracted from a highest frequency of said second band is more than half of said second frequency minus a highest frequency of said first band.

3. The system of claim 1, wherein:
said first band of frequencies is at a lower frequency than said second band;
said first frequency is higher than a highest frequency of said second band; and
said second frequency is lower than said highest frequency of said second band.

4. The system of claim 1, wherein said processor is configured to detect activity of said first network and said second network based on a spectral analysis of said received signal.

5. The system of claim 1, wherein said processor is configured to detect activity of said first network and said second network based on control messages communicated on said first network and/or control messages communicated on said second network.

6. The system of claim 1, wherein said first network is a cable television and/or DOCSIS network and said second network is a Multimedia over Coaxial Alliance (MoCA) network.

7. The system of claim 1, wherein said first network is a cable television and/or DOCSIS network and said second network is a network that operates in accordance with the IEEE 802.11 family of standards.

8. A method comprising:
in a network device that is coupled to a communication medium shared by a first network and a second network, wherein said first network and said second network adaptively utilize the communication medium to dynamically mitigate interference from an aliased signal:
determining whether said first network is active and whether said second network is active, wherein said determining is on a location-by-location basis and wherein criteria used in a first location for determining network activity are different than criteria used in a second location for determining network activity;
when said network device is not in a power-saving mode, configuring said clock generator such that a clock signal is set to a fixed sampling frequency;
when said network device is in a power-saving mode and both of said first network and said second network are active, configuring said clock generator such that a clock signal is set to a first frequency;
when said network device is in a power-saving mode and said first network is active and said second network is inactive, configuring said clock generator such that said clock signal is set to a second frequency; and
digitizing a received signal across a range of frequencies, said received signal encompassing one or both of a first band of frequencies used for said first network and a second band of frequencies used for said second network, wherein the first band of frequencies used for said first network and said second band of frequencies used for said second network are concurrently digitized, wherein said second band of frequencies alias into said first band of frequencies when said clock signal is set to said second frequency, and wherein said first frequency and said second frequency are each less than twice a highest frequency of said second band of frequencies.

9. The method of claim 8, wherein:
when said clock signal is set to said second frequency, said second band of frequencies of said received signal aliases into said first band of frequencies of said received signal during said digitizing; and
when said clock signal is set to said first frequency, said second band of frequencies of said received signal does not alias into said first band of frequencies of said received signal during said digitizing.

10. The method of claim 8, wherein:
said first band of frequencies is at a lower frequency than said second band;
said first frequency is higher than an highest frequency of said second band; and
said second frequency is lower than said highest frequency of said second band.

11. The method of claim 8, wherein said determining is based on a spectral analysis of said received signal.

12. The method of claim 8, wherein said determining is based on control messages communicated on said first network and/or control messages communicated on said second network.

13. The method of claim 8, wherein said first network is a cable television and/or DOCSIS network and said second network is a Multimedia over Coaxial Alliance (MoCA) network.

14. The method of claim 8, wherein said first network is a cable television and/or DOCSIS network and said second network is a network that operates in accordance with the IEEE 802.11 family of standards.

15. A network device comprising a clock signal generator, an analog-to-digital converter (ADC), and a processor, wherein:
said network device is configured to connect to a communication medium shared by a first network and a second network, wherein said first network and said second network adaptively utilize the communication medium to dynamically mitigate interference from an aliased signal;
said ADC is configured to digitize a received signal across a range of frequencies, said received signal encompassing one or both of a first band of frequencies used for said first network and a second band of frequencies used for said second network, wherein the first band of frequencies used for said first network and said second band of frequencies used for said second network are concurrently digitized;
a sampling frequency of said ADC is determined by a frequency of a clock signal output by said clock signal generator;
said processor is configured to determine whether said first network is active and whether said second network is active, wherein network activity is determined on a location-by-location basis and criteria used in a first location to determine network activity are different than criteria used in a second location to determine network activity;
if said network device is not in a power-saving mode, then said processor is configured to set said clock signal to a fixed sampling frequency, else said processor is configured to set said clock signal to one of a first frequency and a second frequency, wherein:
said first frequency and said second frequency are each less than twice a highest frequency of said second band of frequencies;
said second band of frequencies alias into said first band of frequencies when said clock signal is set to said second frequency;
when both of said first network and said second network are active, said clock signal is set to said first frequency; and
when said first network is active and said second network is inactive, said clock signal is set to said second frequency.

16. The system of claim 15, wherein:
when said clock signal is set to said first frequency, half of said first frequency subtracted from a highest frequency of said second band is less than half of said first frequency minus a highest frequency of said first band; and
when said clock signal is set to said second frequency, half of said second frequency subtracted from a highest frequency of said second band is more than half of said second frequency minus a highest frequency of said first band.

17. The network device of claim 15, wherein:
said first band of frequencies is at a lower frequency than said second band of frequencies;
said first frequency is higher than an highest frequency of said second band of frequencies; and
said second frequency is lower than said highest frequency of said second band of frequencies.

18. The network device of claim 15, wherein said processor is configured to detect activity of said first network and said second network based on a spectral analysis of said received signal.

19. The network device of claim 15, wherein said processor is configured to detect activity of said first network and said second network based on control messages communicated on said first network and/or control messages communicated on said second network.

20. The network device of claim 15, wherein said first network is a cable television and/or DOCSIS network and said second network is a Multimedia over Coaxial Alliance (MoCA) network.

* * * * *